(12) United States Patent
Alsaffar (10) Patent No.: US 8,554,292 B1
(45) Date of Patent: Oct. 8, 2013

(54) WRISTBAND FOR AN ELECTRONIC DEVICE

(71) Applicant: Abdulreidha Abdulrasoul Alsaffar, Mubarak Alkabeer (KW)

(72) Inventor: Abdulreidha Abdulrasoul Alsaffar, Mubarak Alkabeer (KW)

( * ) Notice: Subject to any disclaimer, the term of this patent is extended or adjusted under 35 U.S.C. 154(b) by 0 days.

(21) Appl. No.: 13/675,994

(22) Filed: Nov. 13, 2012

(51) Int. Cl.
*H04M 1/00* (2006.01)

(52) U.S. Cl.
USPC .................. 455/575.6; 455/575.4; 455/575.8

(58) Field of Classification Search
USPC ................................ 455/575.4, 575.6, 575.8
See application file for complete search history.

(56) References Cited

U.S. PATENT DOCUMENTS

| | | | |
|---|---|---|---|
| 5,224,076 A | 6/1993 | Thorp | |
| 5,239,521 A | 8/1993 | Blonder | |
| 5,898,161 A | 4/1999 | DeVita et al. | |
| 6,535,605 B1 | 3/2003 | Ghassabian | |
| 6,980,777 B2 * | 12/2005 | Shepherd et al. | 455/90.3 |
| D616,197 S | 5/2010 | Fuccella | |
| 8,099,794 B2 | 1/2012 | Carstens | |
| 8,140,131 B1 * | 3/2012 | Green | 455/575.1 |
| 2003/0019894 A1 | 1/2003 | Caldana | |
| 2003/0164389 A1 | 9/2003 | Byers | |
| 2006/0166720 A1 * | 7/2006 | Dixon | 455/575.6 |
| 2007/0270199 A1 | 11/2007 | Kim et al. | |
| 2009/0088230 A1 | 4/2009 | Park | |

FOREIGN PATENT DOCUMENTS

WO    WO 2004/039204    5/2004

* cited by examiner

*Primary Examiner* — Tuan H Nguyen
(74) *Attorney, Agent, or Firm* — Richard C. Litman (57) ABSTRACT

The wristband for an electronic device provides for the convenient storage and transport of a small electronic device, such as a cell phone, calculator, etc. The wristband has a swivel connector attached thereto. A two-part holder assembly is attached to the swivel connector. An electronic device may be installed in the inner holder. The inner holder extends from the outer holder for use, and retracts into the outer holder for storage. The holder and electronic device are normally oriented with their major axes normal to the circumference of the wristband, i.e., generally aligned with the arm of the wearer of the device. The holders are swiveled to align their major axes across the arm of the wearer and the inner holder is extended from the outer holder in order to access the electronic device therein. This procedure is reversed for storage of the electronic device.

14 Claims, 7 Drawing Sheets

Fig. 7

WRISTBAND FOR AN ELECTRONIC DEVICE

BACKGROUND OF THE INVENTION

1. Field of the Invention

The present invention relates generally to devices for holding an article, and particularly to a wristband for holding an electronic device, such as a cell phone or the like.

2. Description of the Related Art

The miniaturization of electronic devices has resulted in their carriage by the vast majority of the population. Cell phones are likely carried and used by the majority of people in most industrialized nations, and the pocket calculator has been carried by many people for years. In addition, digital cameras as standalone devices or in combination with cell phones ("smart phones") and other small electronic devices are often carried by many people.

When these devices were being developed in the past, they tended to be relatively large and bulky in comparison to their current counterparts. Many of these devices would not fit in the standard pocket of an article of clothing, and had to be carried in a briefcase, a special holster, or other holder that was, in turn, suspended on a belt or otherwise carried on the person. In some respects the provision of an external holster for larger cell phones and the like was a convenience, as the device was readily accessible in the holster. The development of smaller and smaller electronic appliances has obviated the need for a special holster or other carrying device for such appliances, allowing them to be carried directly in a pocket, in a side compartment of a purse, or the like. In some respects, this has decreased the convenience of such devices, as they may not be so convenient to access if they are buried deeply in a pocket or purse.

Current electronic devices, e.g., cell phones, etc., are now sufficiently small and light to permit their carriage on the wrist by means of a suitable wristband or strap and holder. This was not practicable with earlier electronic devices that may have weighed a pound or more.

Thus, a wristband for an electronic device solving the aforementioned problems is desired.

SUMMARY OF THE INVENTION

The wristband for an electronic device provides for the convenient carriage and access of a small electronic device, e.g., a cell phone, etc., on the wrist. The device comprises a relatively wide wristband or strap for stability. Closure of the band is provided by mating hook and loop fasteners at the ends of the strap or band, or by any other practicable means. A circular base is immovably affixed to the wristband. A rotating circular plate is installed upon the base. A first or outer holder is affixed to the circular plate, and is thus capable of rotating relative to the wristband about an axis perpendicular to the plane of the circular base and circular plate. A second or inner holder telescopes into and from the first or outer holder. The inner holder provides for the carriage of an electronic device (cell phone, etc.) therein. The inner holder is normally retracted into the outer holder for storage, the two holders normally being rotated so that their major axis is generally normal to the circumference of the wristband when the electronic device is not in use.

Each of the two holders includes an open window therein to allow the person wearing the wristband to view the display and access the controls of the electronic device carried therein. Accordingly, the person wearing the band or strap and holder may view the display in the event of an incoming call, even though the inner holder and the device installed therein may be retracted within the outer holder. In the event that the wearer of the device wishes to access the electronic appliance to accept a call or for other reason, he or she may rotate the two holders about the rotary attachment of the outer holder to the base on the wristband and extend the inner holder from the outer holder to facilitate access to the electronic device installed in the inner holder. When use of the electronic device is completed, it may be conveniently stored by reversing the above-described process.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The wristband for an electronic device enables a user of an electronic device to carry the device conveniently so that it may be readily accessed for use. Yet, the wristband provides convenient and unobtrusive storage of the electronic device when the device is not in use. While the wristband may be used to carry any practicable electronic device therein, e.g., a small electronic calculator, etc., it is particularly well suited for the carriage of a cell phone therein.

Figure 1:
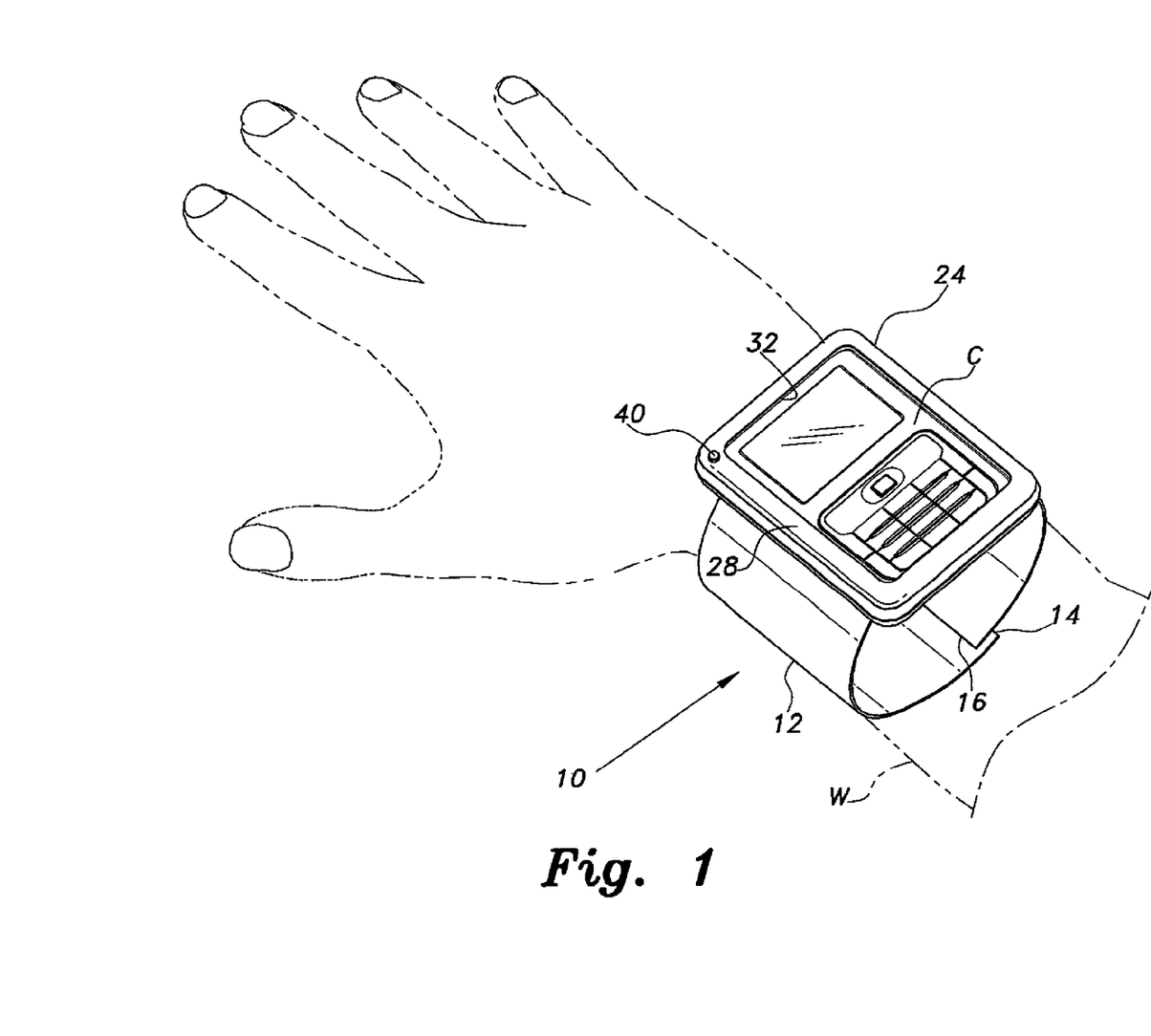
FIG. 1 is an environmental, perspective view of a wristband for an electronic device according to the present invention, showing the electronic device retracted in the holder for carriage and transport.
Figure 2:
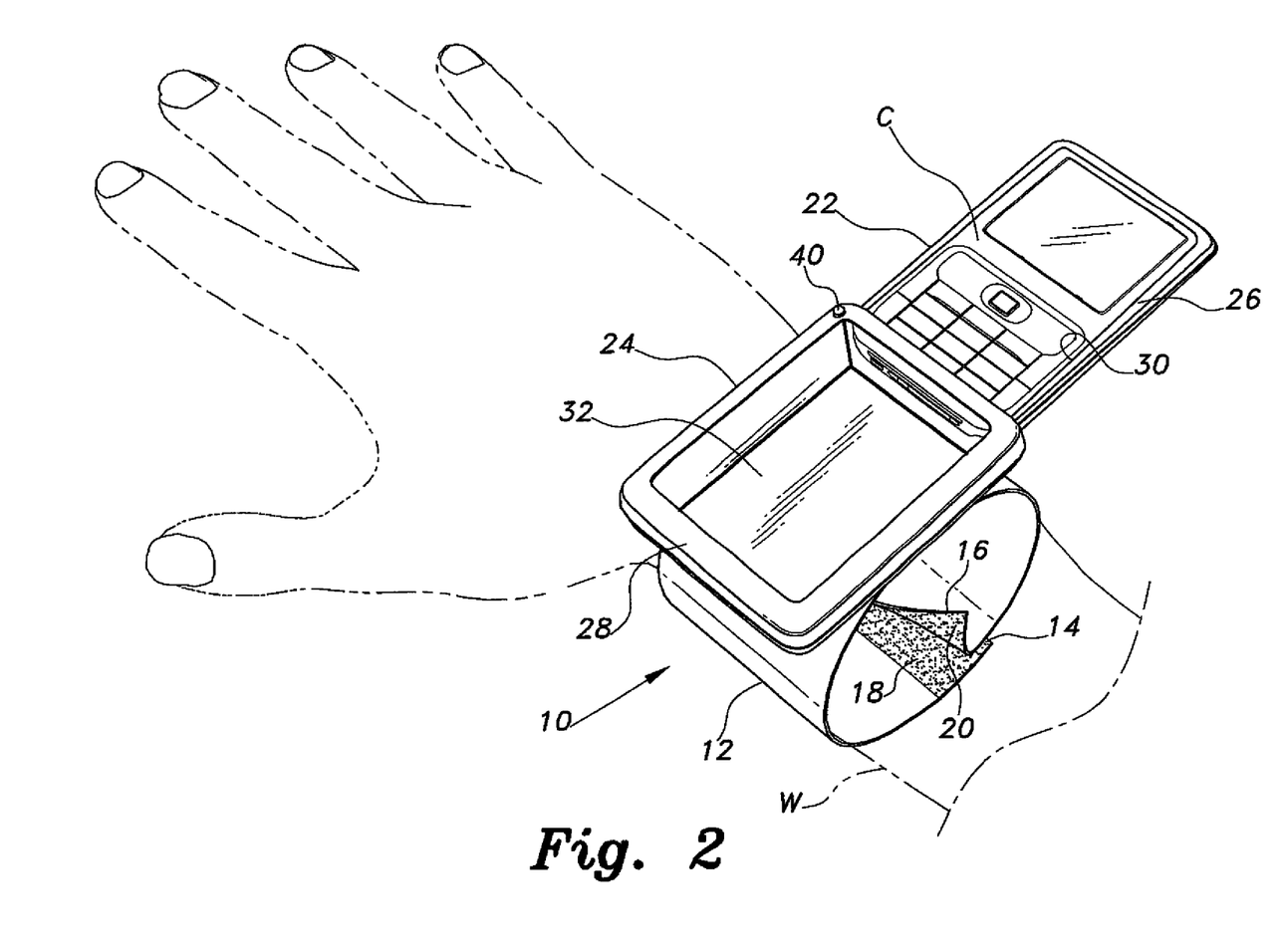
FIG. 2 is an environmental perspective view of a wristband for an electronic device according to the present invention, the electronic device being extended from the holder for use.

FIGS. 1 and 2 provide environmental perspective views of the wristband for an electronic device, or wristband 10. The electronic device carriage portion of the wristband 10 is shown in FIG. 1 in a retracted configuration for storage and transport of the electronic device, and is shown in FIG. 2 in an extended position for use of the electronic device. A cell phone C is illustrated throughout the drawings as the exemplary electronic device carried by the wristband 10. The wristband 10 includes a relatively wide and flexible strap 12 for stability, and the mechanism and structure for carrying the cell phone C (or other device) is attached generally centrally thereto. The strap 12 may be formed of a wide variety of materials, e.g., flexible leather or flexible plastic materials. Since the strap 12 is not elastic, it is not continuous, but has a first end 14 and opposite second end 16 that are generally opposite the center of the strap 12, which has the electronic device carrying structure attached thereto. The first end 14 is provided with a first fastener 18, and the second end 16 is provided with a second fastener 20, as shown in FIG. 2. The two fasteners 18 and 20 may be mating portions of hook and loop fabric material, e.g., Velcro®, or some other means of temporarily and removably joining the two ends 14 and 16 of the strap 12 together around the wrist W of the user.

Two mutually telescoping holders are provided to contain the cell phone C or other electronic device therein. The cell phone C is removably installed within an inner holder 22, which selectively extends from and retracts into an outer holder 24. Each of the two holders 22 and 24 includes a front panel 26, 28. The front panels each have an access opening 30, 32 therethrough for viewing the screen and accessing the controls of the cell phone C or other device contained therein. The inner and outer holder access openings 30 and 32 are not transparent windows, but comprise passages through the front panels of the two holders to allow the user to access the keys and/or other controls of the electronic device contained therein. The outer holder front panel 28 and its access opening 32 are visible in both FIGS. 1 and 2, but the inner holder front panel 26 and its access opening 30 are shown in FIG. 2 due to the retraction of the inner holder 22 into the outer holder 24 in FIG. 1. It will be seen in FIG. 1 that the access opening 30 of the inner holder 22 is congruent with the access opening 32 of the outer holder 24 when the inner holder 22 is retracted into the outer holder 24 to allow the user to access the electronic device contained within the two holders 22, 24, even when the inner holder 22 is retracted.

Figure 3:
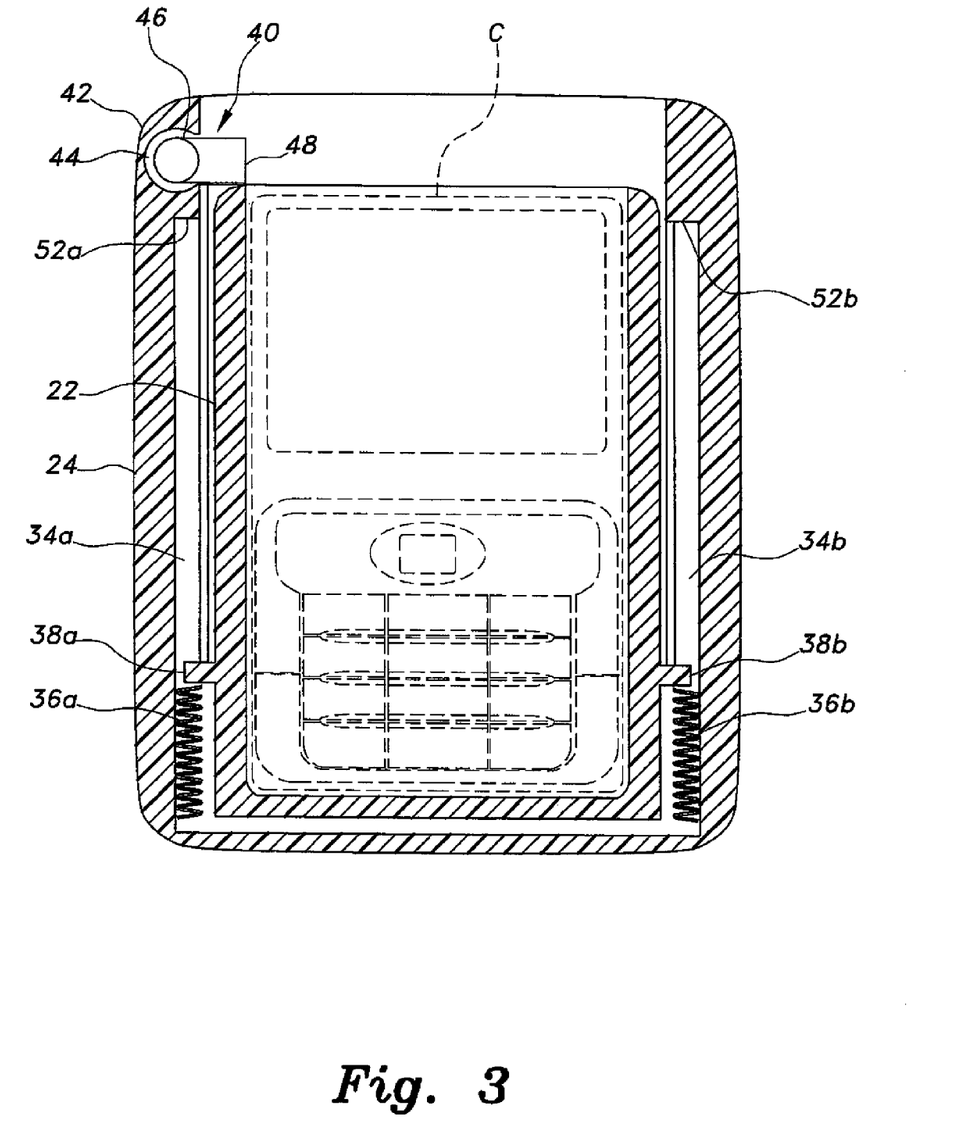
FIG. 3 is a front elevation view in section of the carrying case portion of the wristband of FIG. 1, showing details thereof.
Figure 4:
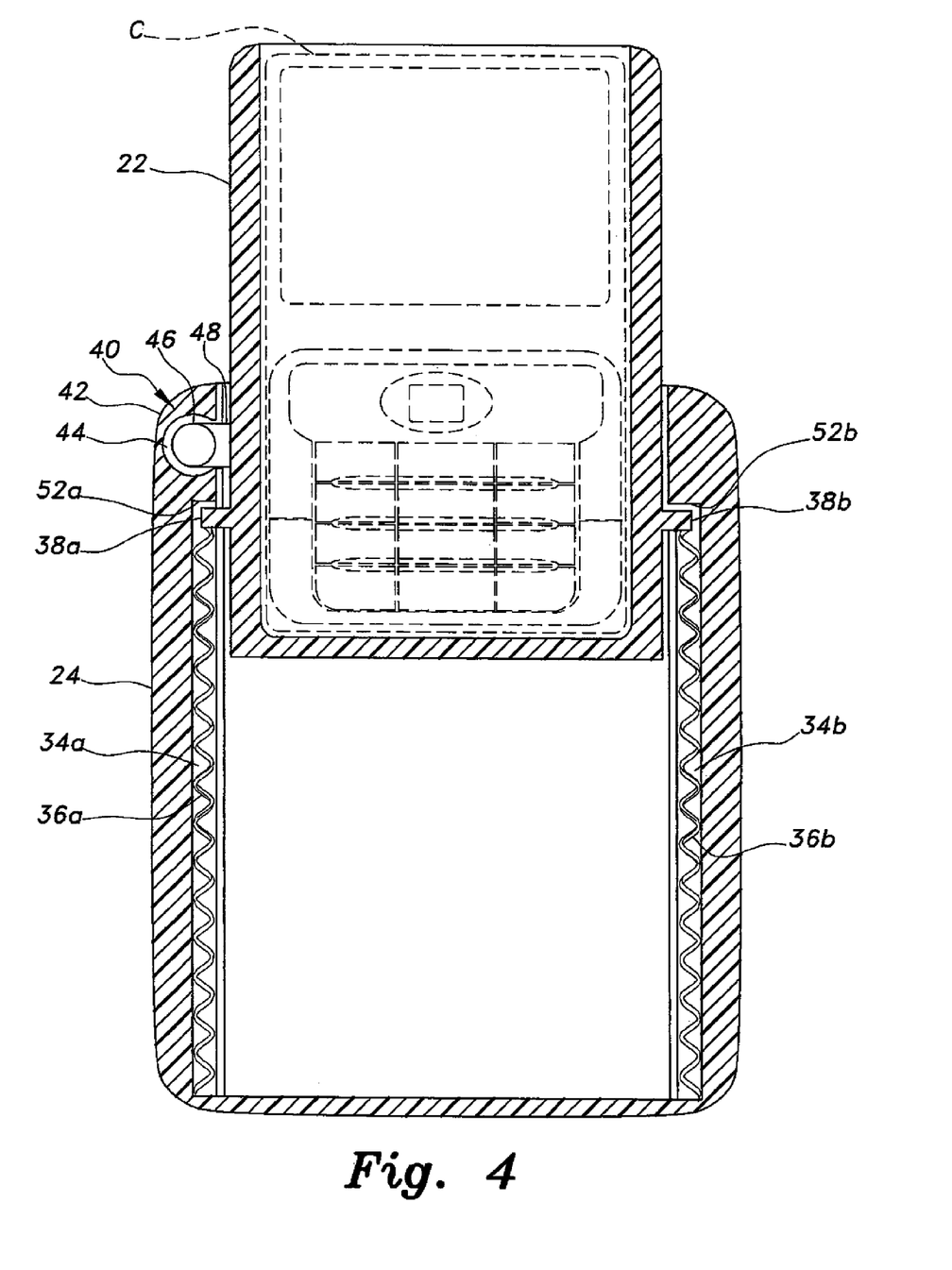
FIG. 4 is a front elevation view in section of the carrying case portion of the wristband of FIG. 1, showing the holder in the extended position.
Figure 5:
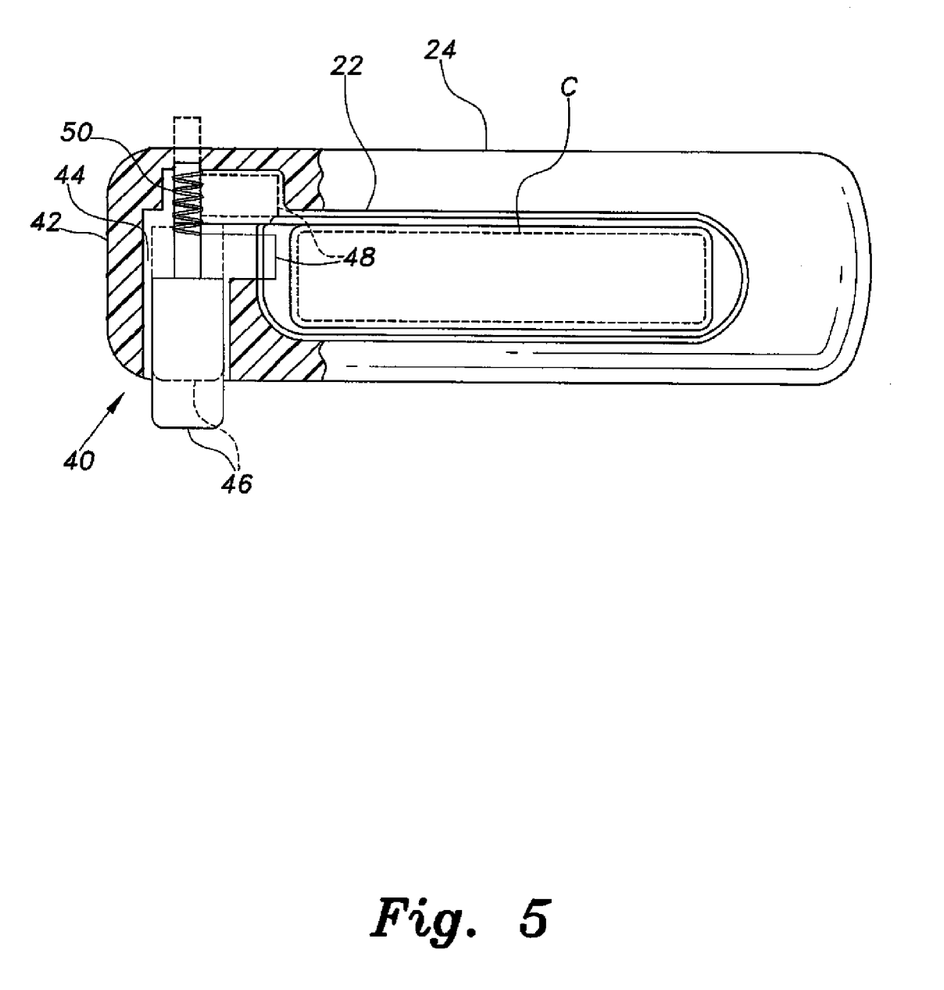
FIG. 5 is a side view in partial section of the carrying case portion of the wristband of FIG. 1, showing the mechanism for releasing the electronic device from its stowed position in the case.

FIGS. 3 through 5 illustrate the mechanism for extending the inner holder 22 from the outer holder 24, and for securing the inner holder 22 within the outer holder 24. The outer holder 24 has two longitudinal channels 34a and 34b therein. First and second inner holder extension springs 36a, 36b are disposed within the laterally opposed channels 34a, 34b. The inner holder 22 has two laterally opposed stops 38a and 38b extending therefrom. The springs 36a, 36b extend in their channels 34a, 34b between the lower end of the outer holder and the stops 38a, 38b of the inner holder 24 to bear against the stops 38a, 38b and bias the inner holder 22 outward from the outer holder 24.

A retaining latch 40 is provided to retain the inner holder 22 in its retracted state within the outer holder 24. The first or left upper corner portion 42 of the first or outer holder 24 has a latch passage 44 formed therein, and a latch button 46 installed in the passage 44. The button 46 moves into and out of the latch passage 44 along an axis perpendicular to the major plane of the inner and outer holders 22 and 24. A tang or finger 48 extends laterally from the button 46 and extends over the first or left upper corner of the inner holder 22 to prevent the inner holder from extending from the outer holder 24, as shown in solid lines in FIG. 5. A retaining latch spring 50 is installed about the shank of the latch button 46, and biases the button 46 to an extended position outside the outer holder 24, as shown in solid lines in FIG. 5.

When the latch button 46 is pressed into the outer holder 24 against the spring 50, the finger or tang 48 is moved beyond the first upper corner of the inner holder 22 to allow the springs 36a, 36b in the outer holder 24 to extend the inner holder from the outer holder. The inner holder 22 is precluded from departing the outer holder 24 by means of upper stops 52a and 52b extending inwardly at the upper end of the outer holder 24. The upper stops 52a, 52b define the respective ends of the channels 34a and 34b and prevent movement of the inner holder stops 38a and 38b past the upper stops 52a, 52b.

The finger or tang 48 rides against the longitudinal edge of the inner holder 22 when the inner holder is extended. Pushing the inner holder 22 back into the outer holder 24 allows the latch spring 50 to push the tang or finger 48 back over the first upper corner of the inner holder 22, thereby locking the inner holder 22 within the outer holder 24, and once again extending the latch button 46.

Figure 6:
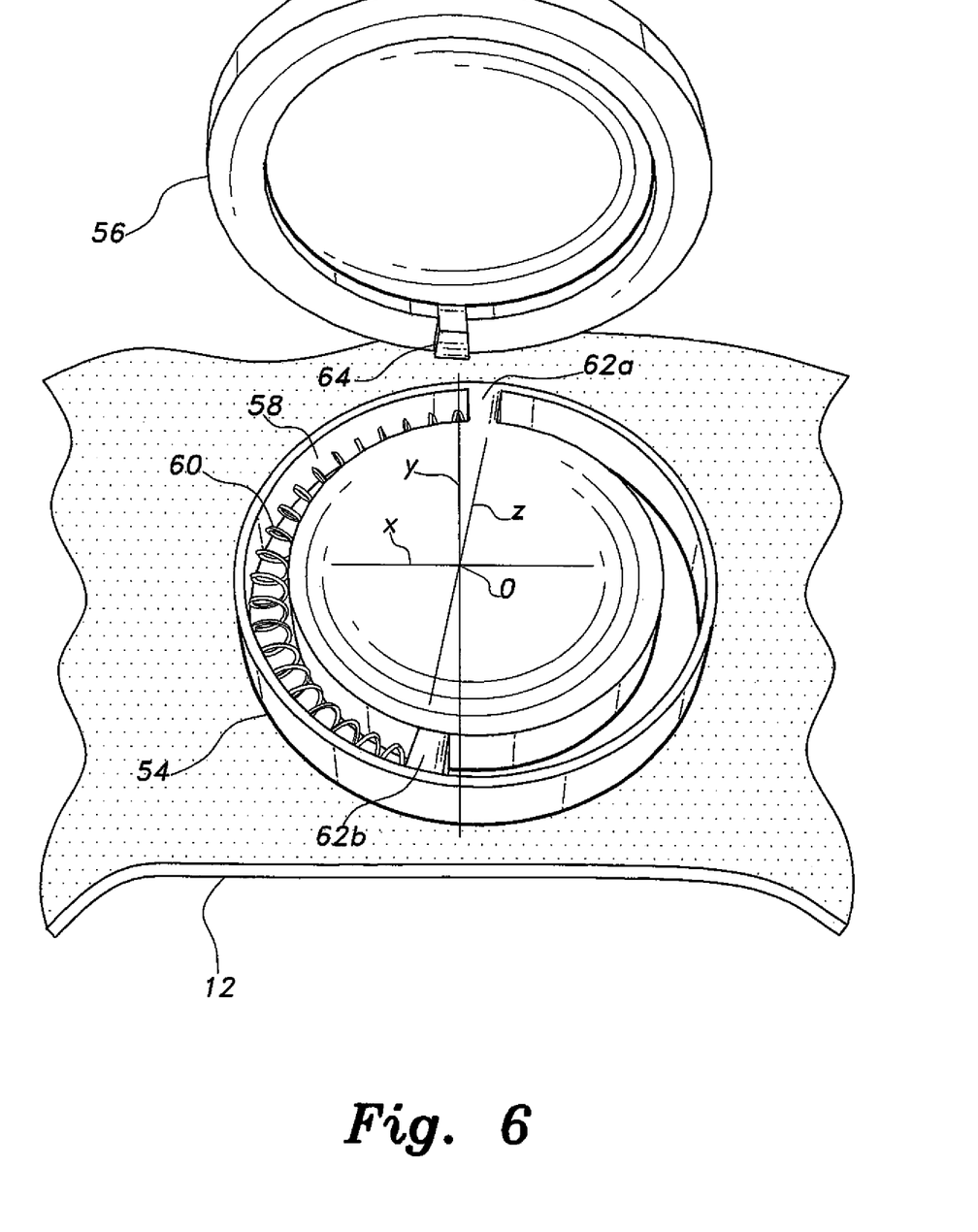
FIG. 6 is an exploded perspective view of the swivel connector between the wristband portion and the carrying case portion of the wristband of FIG. 1, showing internal details thereof.
Figure 7:
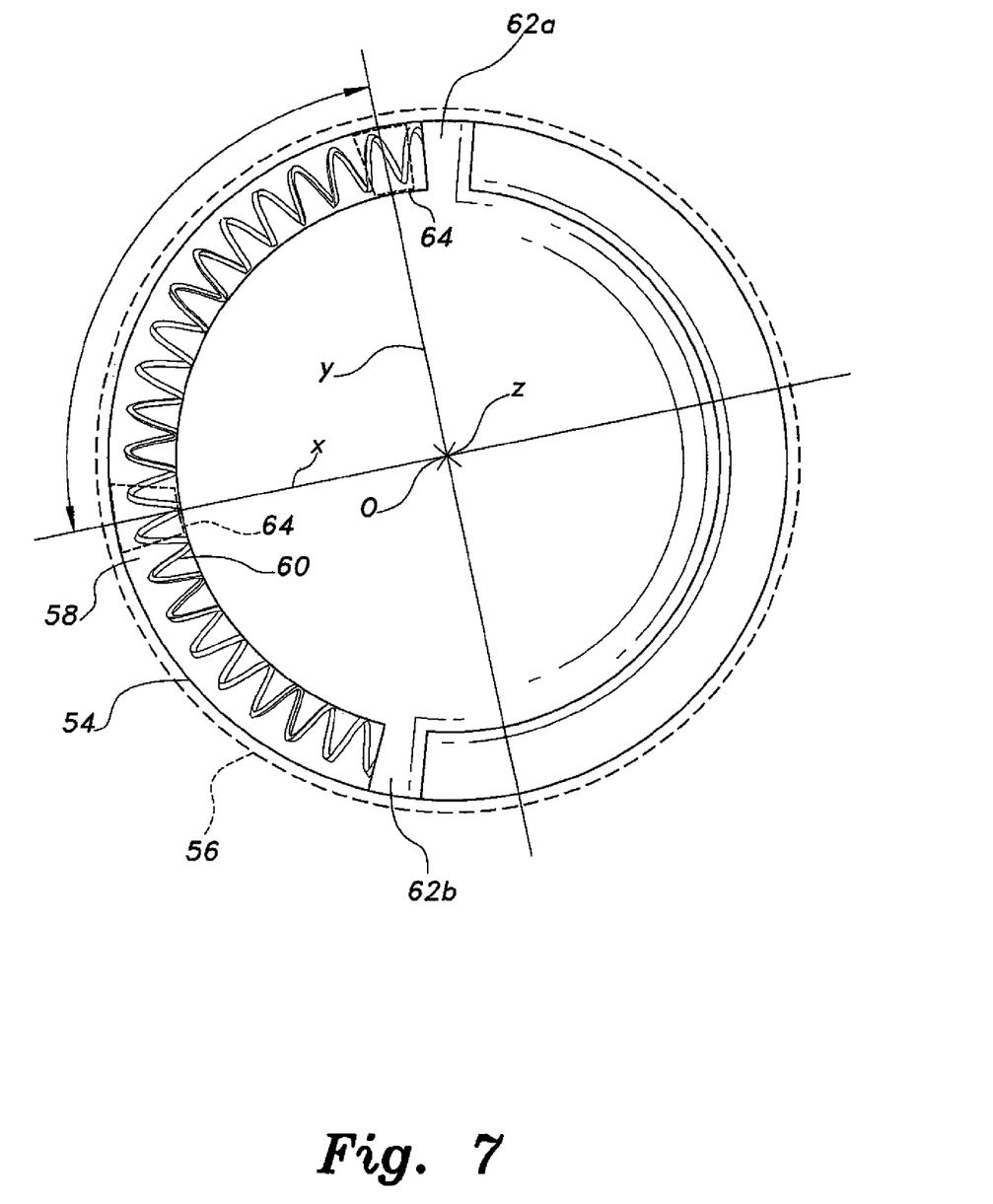
FIG. 7 is a top plan view of the base portion of the swivel connector of FIG. 6, showing the upper portion of the swivel connector in broken lines in its alternative rotated positions.

The outer holder 24 is pivotally attached to the central portion of the strap 12 by a rotational mechanism, as shown in FIGS. 6 and 7 of the drawings. A base 54 is immovably affixed to the central portion of the strap 12. A swivel plate 56 is rotatably attached to the base 54. The swivel plate 56 rotates about a rotational axis Z (shown as an isometric line through the center O of the base 54 in FIG. 6, and as a single point at the center O in the top plan view of FIG. 7) that is perpendicular to the plane of the base 54, and also perpendicular to the mutually perpendicular X and Y axes of the base that extend from the center O. The back of the outer holder 24 is, in turn, affixed to the swivel plate 56. As the swivel plate 56 can rotate relative to its attachment to the base 54 and the strap 12, the outer holder 24 (and the inner holder 22 and electronic device contained therein) also rotate relative to the base 54 and strap 12 about the axis Z perpendicular to the plane of the strap 12 portion directly therebeneath.

The base 54 includes a semicircumferential channel 58 formed therein. A spring 60 is installed within the channel 58. First and second fixed stops 62a and 62b define the opposite ends of the channel 58. The swivel plate 56 includes a rotational stop 64 depending therefrom. The rotational stop 64 travels in the channel 58 of the base 54. The spring 60 bears against the second fixed stop 62b in the channel 58, and also against the rotational stop 64 of the swivel plate 56. This urges the swivel plate 56 to rotate so that its rotational stop 64 is adjacent the first fixed stop 62a of the base 54, i.e., to swivel the plate 56 to position the attached outer holder 24 (and thus the inner holder 22 and any electronic device contained therein, as well) to the orientation shown in FIG. 2 of the drawings.

The two fixed stops 62a and 62b are substantially 180° apart from one another about the circumference of the base 54, but it will be seen that they are slightly offset from the Y axis passing through the center O of the base. This results in the rotational stop 64 of the swivel plate 56 aligning with the Y axis of the base 54 when it contacts the first fixed stop 62a, thus stopping the rotation of the swivel plate 56 when the major axes of the two holders 22 and 24 are substantially aligned with a plane through the closed strap 12, i.e., laterally across the wrist W of the wearer of the device, as shown in FIG. 2. The user of the device may then extend the inner holder 22 from the outer holder 24 by depressing the latch button 44, thus positioning the cell phone C (or other electronic device installed within the inner holder 22) for use, as shown in FIG. 2 of the drawings. When use of the device has ended, the inner holder 22 is pushed back into the outer holder 24 so that the latch tang or finger 48 (FIGS. 3, 4, and 5) moves back over the upper edge of the inner holder 22 to secure it in its retracted position within the outer holder 24. The inner and outer holders 22 and 24 are then swiveled about their mutual Z axis (FIGS. 6 and 7) to align the major axis of the two holders 22 and 24 with the wrist W of the user, generally as shown in FIG. 1 of the drawings.

It is to be understood that the present invention is not limited to the embodiments described above, but encompasses any and all embodiments within the scope of the following claims.

I claim:

1. A wristband for an electronic device, comprising:
a strap adapted for removable placement about a wrist;
an outer holder disposed generally centrally upon the strap, the outer holder having a front panel, the front panel having an access opening defined therein;
an inner holder telescopically disposed within the outer holder, the inner holder being adapted for the removable placement of an electronic device therein, the inner holder having a front panel and an access opening defined in the front panel, the access opening of the outer holder and the access opening of the inner holder being substantially congruent with one another when the inner holder is retracted into the outer holder;
a base immovably affixed to the strap;
wherein the base having a semicircumferential channel disposed therein;
a swivel plate rotatably disposed upon the base, the outer holder being affixed to the swivel plate;
a rotational stop depending from the swivel plate, the rotational stop being disposed within the semicircumferential channel of the base; and
a spring disposed within the semicircumferential channel of the base, the spring bearing against the rotational stop of the swivel plate.

2. The wristband for an electronic device according to claim 1, further comprising a cell phone removably disposed within the inner holder.

3. The wristband for an electronic device according to claim 1, further comprising:
a retaining latch disposed through a first upper corner portion of the outer holder;
laterally opposed, first and second extension springs disposed within the outer holder; and
laterally opposed, first and second stops extending from the inner holder, the springs bearing against the stops, the springs biasing the inner holder away from the outer holder, the retaining latch selectively precluding extension of the inner holder from the outer holder.

4. The wristband for an electronic device according to claim 1, wherein the strap is formed of a material selected from the group consisting of leather and flexible plastic.

5. The wristband for an electronic device according to claim 1, wherein the strap having a first end and a second end opposite the first end, the wristband further comprising:
a first fastener disposed at the first end of the strap; and
a second fastener disposed at the second end of the strap, the first fastener selectively securing to the second fastener for removably securing the first end of the strap to the second end of the strap.

6. A wristband for an electronic device, comprising:
a strap adapted for removable placement about a wrist;
a base immovably affixed generally centrally to the strap;
a semicircumferential channel disposed in the base;
a swivel plate rotatably disposed upon the base;
at least one holder affixed to the swivel plate, the holder being adapted for the removable placement of an electronic device therein;
a rotational stop depending from the swivel plate, the rotational stop being disposed within the semicircumferential channel of the base; and
a spring disposed within the semicircumferential channel of the base, the spring bearing against the rotational stop of the swivel plate.

7. The wristband for an electronic device according to claim 6, wherein said at least one holder comprises:
an outer holder affixed to the swivel plate, the outer holder having a front panel and an access opening defined in the front panel; and
an inner holder telescopically disposed within the outer holder, the inner holder being adapted for the removable placement of an electronic device therein, the inner holder having a front panel and an access opening defined in the front panel, the access opening of the outer holder and the access opening of the inner holder being substantially congruent with one another when the inner holder is retracted into the outer holder.

8. The wristband for an electronic device according to claim 7, further comprising a cell phone removably disposed within the inner holder.

9. The wristband for an electronic device according to claim 6, further comprising:
a retaining latch disposed through a first upper corner portion of the outer holder;
laterally opposed, first and second extension springs disposed within the outer holder; and
laterally opposed, first and second stops extending from the inner holder, the springs bearing against the stops, the springs biasing the inner holder away from the outer holder, the retaining latch selectively precluding extension of the inner holder from the outer holder.

10. The wristband for an electronic device according to claim 6, wherein the strap is formed of a material selected from the group consisting of leather and flexible plastic.

11. The wristband for an electronic device according to claim 6, wherein the strap having a first end and a second end opposite the first end, the wristband further comprising:
a first fastener disposed at the first end of the strap; and
a second fastener disposed at the second end of the strap, the first fastener selectively securing to the second fastener for removably securing the first end of the strap to the second end of the strap.

12. A wristband-mounted cell phone, comprising:
a strap adapted for removable placement about a wrist;
a base having a semicircumferential channel defined therein, immovably affixed generally centrally to the strap;
at least one holder affixed to the base, the holder being adapted for the removable placement of a cell phone therein, the holder having a front panel defining a cell phone access opening therein;
wherein said at least one holder includes an outer holder disposed upon the base, and an inner holder disposed within the outer holder;
a cell phone removably disposed within the at least one holder;
an outer holder disposed upon the base, the outer holder having a front panel defining an access opening therein;
the inner holder being telescopically disposed within the outer holder, the inner holder being adapted for the removable placement of the cell phone therein, the inner holder having a front panel defining an access opening therein, the access opening of the outer holder and the access opening of the inner holder being substantially congruent with one another when the inner holder is retracted into the outer holder;
a swivel plate rotatably disposed upon the base, the outer holder being affixed to the swivel plate;
a rotational stop depending from the swivel plate, the rotational stop being disposed within the semicircumferential channel of the base; and a spring disposed within the semicircumferential channel of the base, the spring bearing against the rotational stop of the swivel plate.

13. The wristband-mounted cell phone according to claim 12, further comprising:
- a retaining latch disposed through a first upper corner portion of the outer holder;
- laterally opposed, first and second extension springs disposed within the outer holder; and
- laterally opposed, first and second stops extending from the inner holder, the springs bearing against the stops, the springs biasing the inner holder away from the outer holder, the retaining latch selectively precluding extension of the inner holder from the outer holder.

14. The wristband-mounted cell phone according to claim 12, wherein the strap has a first end and a second end opposite the first end, the wristband-mounted cell phone further comprising:
- a first fastener disposed at the first end of the strap; and
- a second fastener disposed at the second end of the strap, the first fastener selectively securing to the second fastener for removably securing the first end of the strap to the second end of the strap, the strap being formed of a material selected from the group consisting of leather and flexible plastic.

* * * * *